US012206159B2

(12) United States Patent
Chao

(10) Patent No.: US 12,206,159 B2
(45) Date of Patent: Jan. 21, 2025

(54) INTEGRATED ANTENNA

(71) Applicant: Emplus Technologies, Inc., Taipei (TW)

(72) Inventor: Shih-Ying Chao, Taipei (TW)

(73) Assignee: Emplus Technologies, Inc., Taipei (TW)

( * ) Notice: Subject to any disclaimer, the term of this patent is extended or adjusted under 35 U.S.C. 154(b) by 114 days.

(21) Appl. No.: 18/069,665

(22) Filed: Dec. 21, 2022

(65) Prior Publication Data

US 2024/0170831 A1 May 23, 2024

(30) Foreign Application Priority Data

Nov. 18, 2022 (TW) .................................. 111144296

(51) Int. Cl.

*H01Q 1/24* (2006.01)
*H01Q 1/38* (2006.01)
*H01Q 1/48* (2006.01)
*H01Q 1/50* (2006.01)

(52) U.S. Cl.

CPC ............... *H01Q 1/243* (2013.01); *H01Q 1/38* (2013.01); *H01Q 1/48* (2013.01); *H01Q 1/50* (2013.01)

(58) Field of Classification Search

CPC ............ H01Q 1/243; H01Q 1/38; H01Q 1/48; H01Q 1/50

See application file for complete search history.

(56) References Cited

U.S. PATENT DOCUMENTS

| | | | | |
|---|---|---|---|---|
| 7,088,299 | B2 | 8/2006 | Siegler | |
| 9,401,547 | B2 | 7/2016 | Montgomery | |
| 2006/0109179 | A1* | 5/2006 | Humpfer .............. | H01Q 19/023 343/700 MS |
| 2009/0115665 | A1 | 5/2009 | Hung et al. | |
| 2012/0050111 | A1 | 3/2012 | Tai et al. | |
| 2012/0299785 | A1 | 11/2012 | Bevelacqua | |
| 2020/0321696 | A1* | 10/2020 | Chen ...................... | H01Q 1/243 |
| 2020/0365989 | A1* | 11/2020 | Mattox ................ | H01Q 9/0421 |

FOREIGN PATENT DOCUMENTS

| | | |
|---|---|---|
| CN | 105356063 A | 2/2016 |
| TW | 097222740 | 5/2009 |

* cited by examiner

*Primary Examiner* — Henry Luong

(74) *Attorney, Agent, or Firm* — Hawkinson Yang LLP

(57) ABSTRACT

An integrated antenna includes a first antenna, a second antenna, and a third antenna. The second antenna is electrically connected to the first antenna. The third antenna is electrically connected to the first antenna and the second antenna, and the third antenna is integrated with the first antenna and the second antenna to form the integrated antenna. Lengths of the first antenna, the second antenna, and the third antenna are different.

14 Claims, 4 Drawing Sheets

INTEGRATED ANTENNA

CROSS-REFERENCE TO RELATED APPLICATION

This application claims priority to Taiwan Application Serial Number 111144296 filed Nov. 18, 2022, the disclosures of which are incorporated herein by reference in their entireties.

BACKGROUND

Field of Invention

The present disclosure relates to a communication device. More particularly, the present disclosure relates to an integrated antenna.

Description of Related Art

With the development of technology, wireless communication technology is used in consumer electronics gradually. For enhancing ranges of consumer electronics, multi-frequency-band and multi-feed-in technology came into being, such that consumer electronics can be used in multiple frequency bands.

However, if multi-frequency-band and multi-feed-in technology is adopted, multiple antennas are needed. Owing to limiting space of consumer electronics, how to put multiple antennas into consumer electronics is an urgent need for industry to find out a solution.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

The present disclosure provides an integrated antenna includes a first antenna, a second antenna, and a third antenna. The second antenna is electrically connected to the first antenna. The third antenna is electrically connected to the first antenna and the second antenna, and the third antenna is integrated with the first antenna and the second antenna to form the integrated antenna. Lengths of the first antenna, the second antenna, and the third antenna are different.

The present disclosure provides an integrated antenna includes a first antenna, a second antenna, and a third antenna. The second antenna is electrically connected to the first antenna. The third antenna is electrically connected to the first antenna and the second antenna, and the third antenna is integrated with the first antenna and the second antenna to form the integrated antenna. The first antenna, the second antenna and the third antenna operate in different frequency bands.

Therefore, based on the technical content of the present disclosure, the present disclosure integrates a plurality of antennas into single integrated antenna thereby reduce the size of the antenna so as to decrease the overall size of the product.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DETAILED DESCRIPTION

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms “a” and “an” include the plural reference unless the context clearly indicates otherwise.

Figure 1:
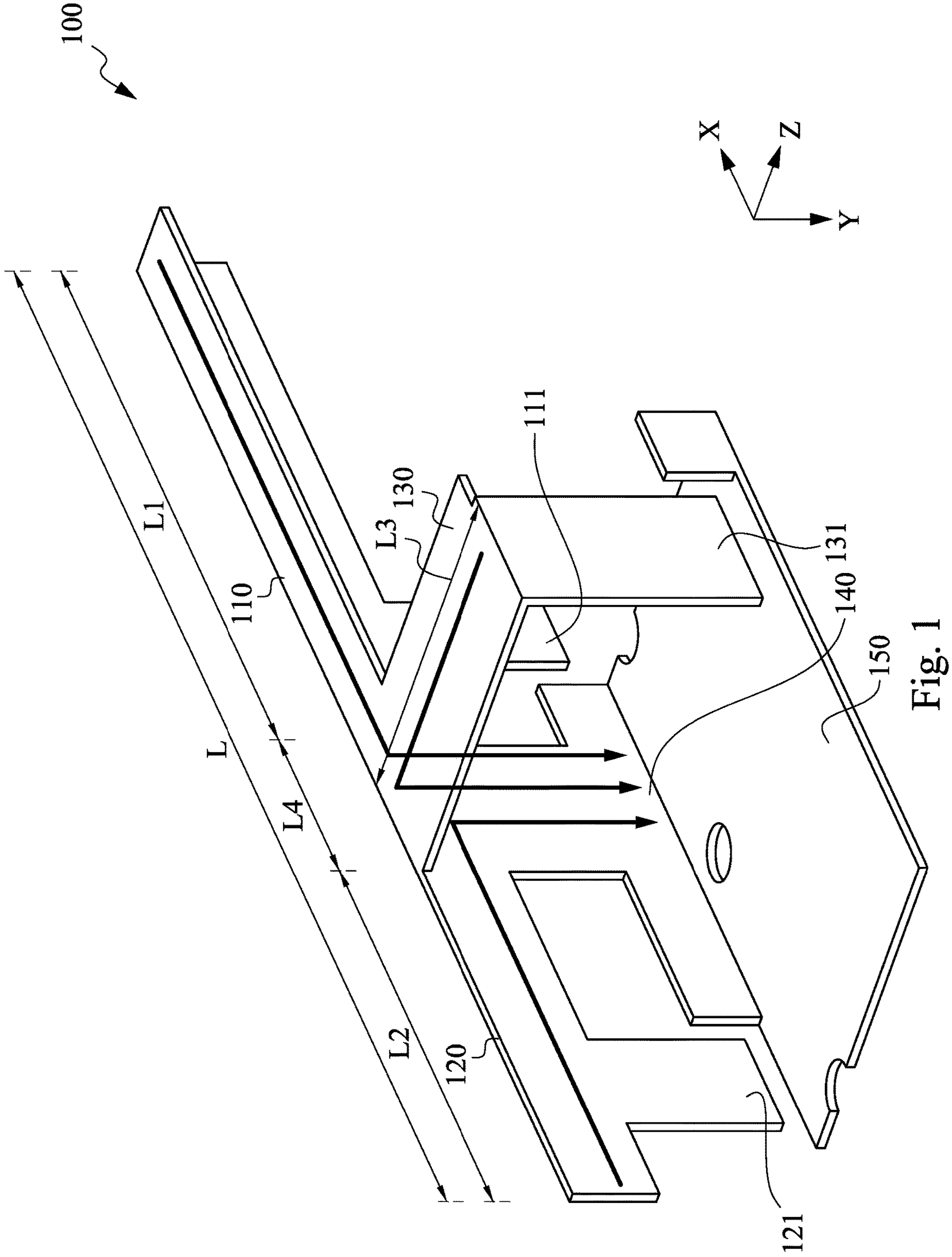
FIG. 1 depicts a schematic diagram of an integrated antenna according to one embodiment of the present disclosure.

FIG. 1 depicts a schematic diagram of an integrated antenna 100 according to one embodiment of the present disclosure. As shown in the figure, the integrated antenna 100 includes a first antenna 110, a second antenna 120, and a third antenna 130.

Figure 2:
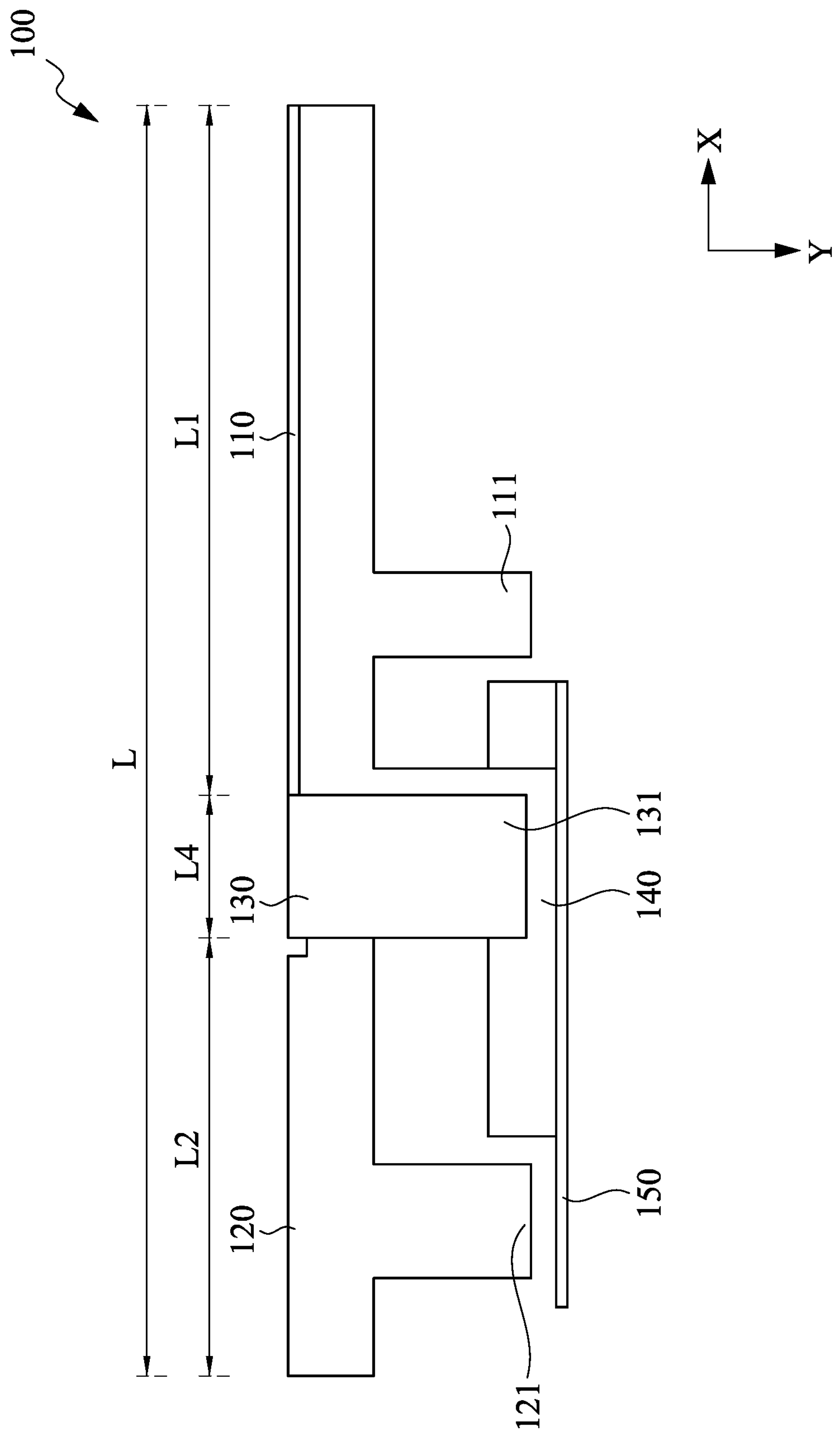
FIG. 2 depicts a schematic diagram of a front view of the integrated antenna shown in FIG. 1 according to one embodiment of the present disclosure.
Figure 3:
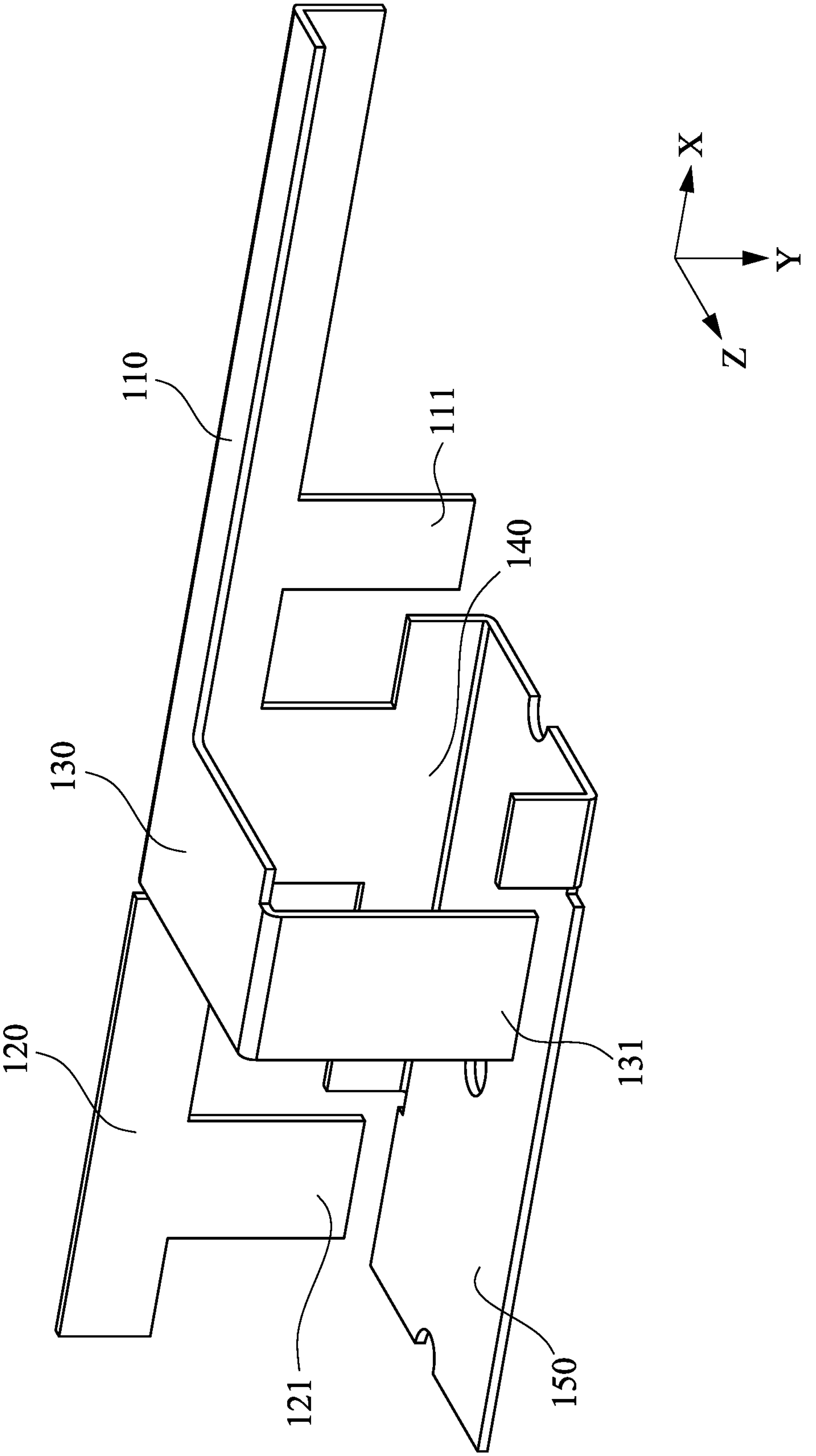
FIG. 3 depicts a schematic diagram of another angle of view of the integrated antenna shown in FIG. 1 according to one embodiment of the present disclosure.

For facilitating the understanding of the structure of the integrated antenna 100 of the present disclosure, reference is now made to both FIG. 2 and FIG. 3, which depict schematic diagrams of another angle of views of the integrated antenna 100 shown in FIG. 1 according to one embodiment of the present disclosure.

As shown in FIG. 1 to FIG. 3, with respect to structures, the first antenna 110 is electrically connected to the second antenna 120. The third antenna 130 is electrically connected to both of the first antenna 110 and the second antenna 120. In other words, the third antenna 130 is integrated with the first antenna 110 and the second antenna 120 to form the integrated antenna 100 of the present disclosure.

In this embodiment, lengths of the first antenna 110, the second antenna 120, and the third antenna 130 are different. Therefore, the first antenna 110, the second antenna 120, and the third antenna 130 operate in different frequency bands, for example, the first antenna 110 operates in 2.4 GHz, the second antenna 120 operates in 5 GHz, and the third antenna 130 operates in 6 GHz. In another embodiment, the integrated antenna 100 of the present disclosure can be used in WiFi wireless network with 2.4 GHz and 5 GHz, or can be used in WiFi-7 wireless network with 6 GHz, which operates in 5.95 GHz-7.125 GHz. Since the present disclosure integrates a plurality of antennas to form the integrated antenna 100, the size of antenna can be reduced, so as to decrease overall size of product. In addition, since antennas are integrated into single integrated antenna, there is no need to use different molds to manufacture different types of antennas, thereby reducing the manufacturing cost.

In one embodiment, a first length L1 of the first antenna 110 rangers from 22 millimeters (mm) to 25 millimeters. In another embodiment, the first length L1 of the first antenna 110 can be 22.5 millimeters, 23 millimeters, 23.5 millimeters, 24 millimeters, or 24.5 millimeters.

In one embodiment, a second length L2 of the second antenna 120 rangers from 14 millimeters to 17 millimeters. In another embodiment, the second length L2 of the second antenna 120 can be 14.5 millimeters, 15 millimeters, 15.5 millimeters, 16 millimeters, or 16.5 millimeters.

In one embodiment, a third length L3 of the third antenna 130 rangers from 10 millimeters to 13 millimeters. In another embodiment, the third length L3 of the third antenna 130 can be 10.5 millimeters, 11 millimeters, 11.5 millimeters, 12 millimeters, or 12.5 millimeters. In one embodiment, a width L4 of the third antenna 130 rangers from 5 millimeters to 10 millimeters. In another embodiment, the width L4 of the third antenna 130 can be 6 millimeters, 7 millimeters, 8 millimeters, or 9 millimeters.

In one embodiment, a total length L of the integrated antenna 100 is a sum of the first length L1, the second length L2, and the width L4, and the total length L of the integrated antenna 100 rangers from 40 millimeters to 50 millimeters. In another embodiment, the total length L of the integrated antenna 100 can be 41 millimeters, 42 millimeters, 43 millimeters, 44 millimeters, 45 millimeters, 46 millimeters, 47 millimeters, 48 millimeters, and 49 millimeters.

Reference is now made to FIG. 1 to FIG. 3, the first antenna 110 can be a 2.4 GHz antenna, the second antenna 120 can be a 5 GHz antenna, and the third antenna 130 can be a 6 GHz antenna.

In one embodiment, the first antenna 110 and the second antenna 120 are disposed on a plane. For example, the first antenna 110 and the second antenna 120 are disposed on a XY plane. In addition, the third antenna 130 is perpendicular to the plane. For example, the third antenna 130 is located along Z axis. Therefore, the third antenna 130 is perpendicular to the XY plane.

In one embodiment, feed-in terminals of the first antenna 110, the second antenna 120, and the third antenna 130 are different. For example, a feed-in terminal 111 of the first antenna 110 is located below the first antenna 110 in the figure. A feed-in terminal 121 of the second antenna 120 is located below the second antenna 120 in the figure. A feed-in terminal 131 of the third antenna 130 is located below the third antenna 130 in the figure. In view of the above, the integrated antenna 100 of the embodiment of the present disclosure can be a three-frequency-band and three feed-in antenna. Owing to the first antenna 110, the second antenna 120, and the third antenna 130 having their own feed-in terminal, independent feed-in terminal does not need a multiplexer at a rear end for processing, thereby reducing signal power loss and decreasing the cost of the entire device.

In one embodiment, the first antenna 110, the second antenna 120, and the third antenna 130 share a ground terminal. For example, the first antenna 110, the second antenna 120, and the third antenna 130 may share the ground terminal 140 which is a convergence of the three antennas in the figure. In this embodiment, current paths of the first antenna 110, the second antenna 120, and the third antenna 130 are shown in the figure, and the currents all flow into the ground terminal 140. In another embodiment, the integrated antenna 100 further includes a layer structure 150. The layer structure 150 is disposed on the XZ plane. The first antenna 110, the second antenna 120, and the third antenna 130 are disposed on the layer structure 150.

In one embodiment, the first antenna 110 can be an inverted-F antenna, for example, a Planar Inverted F-shaped Antenna (PIFA). The second antenna 120 can be an inverted-F antenna, and the third antenna 130 can be a ring-shaped antenna. Reference is made to FIG. 1 to FIG. 3, the inverted-F antenna 110 and the inverted-F antenna 120 can be connected together, and disposed on the XY plane. In addition, the ring-shaped antenna 130 is disposed along Z axis, perpendicular to the inverted-F antenna 110 and the inverted-F antenna 120, and electrically connected to the inverted-F antenna 110 and the inverted-F antenna 120.

In one embodiment, the first antenna 110, the second antenna 120, and the third antenna 130 can be all made by metal. For example, the first antenna 110, the second antenna 120, and the third antenna 130 can be made by the same ironwork. Since the integrated antenna 100 can be made by the same ironwork after integrating, there is no need to used different molds to manufacture different ironworks, thereby reducing the manufacturing cost.

It is noted that the present disclosure is not limited to the structure as shown in FIG. 1 to FIG. 3, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

Figure 4:
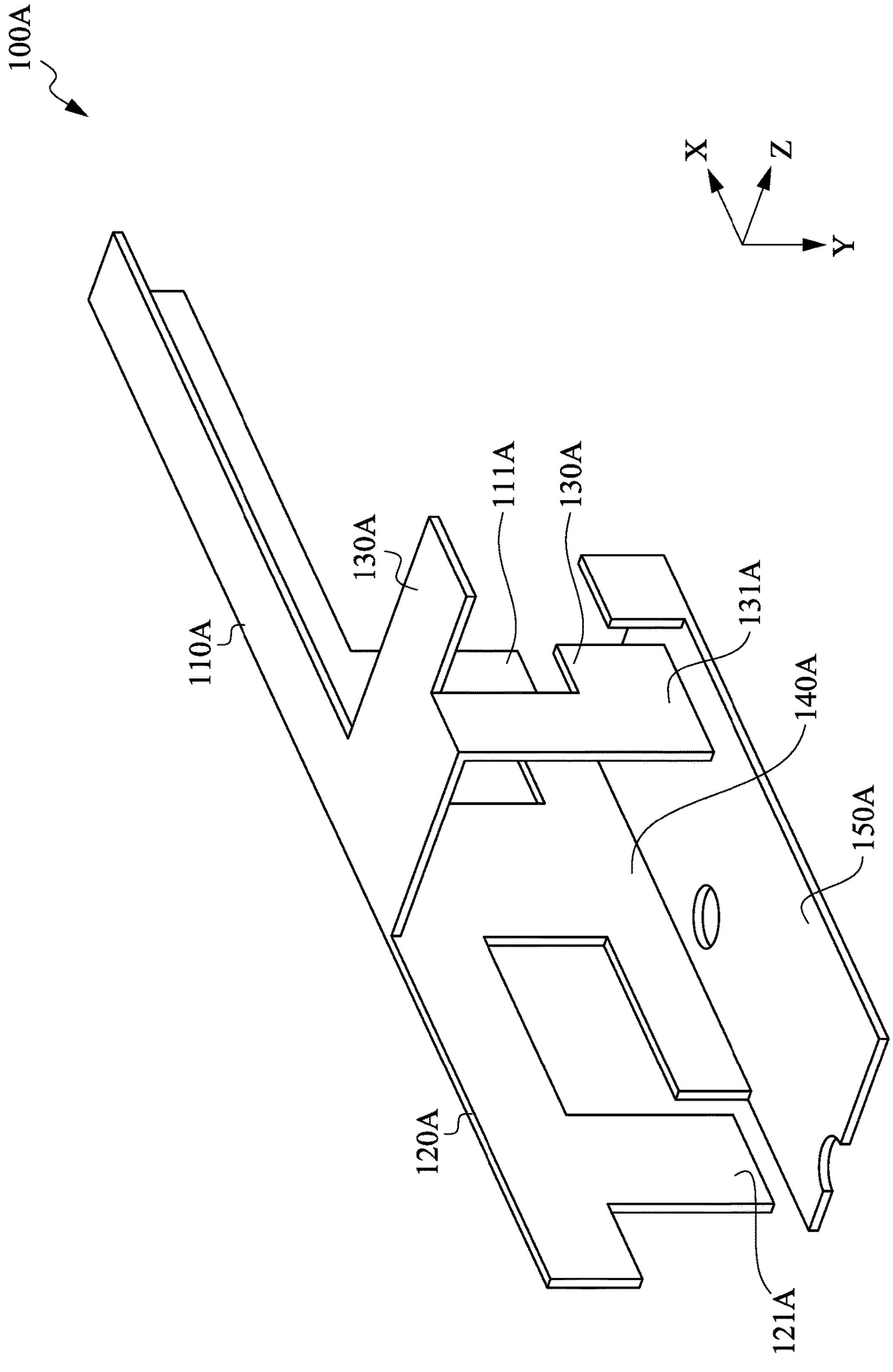
FIG. 4 depicts a schematic diagram of an integrated antenna according to one embodiment of the present disclosure.

FIG. 4 depicts a schematic diagram of an integrated antenna 100A according to one embodiment of the present disclosure. Compared with the integrated antenna 100 shown in FIG. 1 to FIG. 3, the structure of the third antenna 130A of the integrated antenna 100A in FIG. 4 is different, which will be described in detailed as below.

As shown in the figure, the first antenna 110A, the second antenna 120A, and the third antenna 130A can be inverted-F antennas. With respect to structures, the inverted-F antenna 110A and the inverted-F antenna 120A can be connected together, and disposed on the XY plane. In addition, the inverted-F antenna 130A is disposed along Z axis, perpendicular to the inverted-F antenna 110A and the inverted-F antenna 120A, and electrically connected to the inverted-F antenna 110A and the inverted-F antenna 120A.

It is noted that the present disclosure is not limited to the structure as shown in FIG. 4, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

It can be understood from the embodiments of the present disclosure that application of the present disclosure has the following advantages. Since the present disclosure integrates a plurality of antennas to form each of the integrated antennas 100, 100A, the size of each of antennas can be reduced, so as to decrease the overall size of the product. In addition, owing to the first antennas 110, 110A, the second antennas 120, 120A, and the third antennas 130, 130A having their own feed-in terminal, independent feed-in terminal does not need a multiplexer at a rear end for processing, thereby reducing signal power loss and decreasing the cost of the entire device. Besides, since antennas are integrated into each of single integrated antennas 100, 100A, there is no need to used different molds to manufacture different types of antennas, thereby reducing the manufacturing cost.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An integrated antenna, comprising:

a first antenna;

a second antenna, electrically connected to the first antenna; and a third antenna, electrically connected to the first antenna and the second antenna, and integrated with the first antenna and the second antenna to form the integrated antenna, wherein lengths of the first antenna, the second antenna and the third antenna are different; and wherein feed-in terminals of the first antenna, the second antenna, and the third antenna are different.

2. The integrated antenna of claim 1, wherein a first length of the first antenna rangers from 22 millimeters to 25 millimeters, a second length of the second antenna rangers from 14 millimeters to 17 millimeters, a third length of the third antenna rangers from 10 millimeters to 13 millimeters, and a width of the third antenna rangers from 5 millimeters to 10 millimeters.

3. The integrated antenna of claim 1, wherein a total length of the integrated antenna rangers from 40 millimeters to 50 millimeters.

4. The integrated antenna of claim 1, wherein the first antenna comprises a 2.4 GHz antenna, the second antenna comprises a 5 GHz antenna, and the third antenna comprises a 6 GHz antenna.

5. The integrated antenna of claim 1, wherein the first antenna and the second antenna are disposed on a plane, and the third antenna is perpendicular to the plane.

6. The integrated antenna of claim 1, wherein the first antenna, the second antenna, and the third antenna share a ground terminal.

7. The integrated antenna of claim 1, wherein each of the first antenna and the second antenna comprises an inverted-F antenna, and the third antenna comprises a ring-shaped antenna.

8. The integrated antenna of claim 1, wherein each of the first antenna, the second antenna, and the third antenna comprises an inverted-F antenna.

9. The integrated antenna of claim 1, wherein the first antenna, the second antenna, and the third antenna comprise metal.

10. An integrated antenna, comprising:

a first antenna;

a second antenna, electrically connected to the first antenna; and a third antenna, electrically connected to the first antenna and the second antenna, and integrated with the first antenna and the second antenna to form the integrated antenna, wherein the first antenna, the second antenna and the third antenna operate in different frequency bands; and wherein feed-in terminals of the first antenna, the second antenna, and the third antenna are different.

11. The integrated antenna of claim 10, wherein the first antenna operates in 2.4 GHz.

12. The integrated antenna of claim 10, wherein the second antenna operates in 5 GHz.

13. The integrated antenna of claim 10, wherein the third antenna operates in 6 GHz.

14. The integrated antenna of claim 10, wherein a first length of the first antenna rangers from 22 millimeters to 25 millimeters, a second length of the second antenna rangers from 14 millimeters to 17 millimeters, a third length of the third antenna rangers from 10 millimeters to 13 millimeters, and a width of the third antenna rangers from 5 millimeters to 10 millimeters, wherein a total length of the integrated antenna rangers from 40 millimeters to 50 millimeters.

* * * * *